United States Patent

Baek et al.

Patent Number: 6,033,727
Date of Patent: Mar. 7, 2000

[54] METHOD FOR STRENGTHENING AND AGING-PREVENTION OF TZP BY FORMATION OF SILICA/ZIRCON LAYER ON THE SURFACE THEREOF

[75] Inventors: Yong Kee Baek, Daejon; Hyoun-Ee Kim; Young Hak Ko, both of Seoul; Eul-Son Kang, Daejon, all of Rep. of Korea

[73] Assignee: Agency for Defense Development, Rep. of Korea

[21] Appl. No.: 09/234,927

[22] Filed: Jan. 22, 1999

[30] Foreign Application Priority Data

Apr. 23, 1998 [KR] Rep. of Korea ............... 98-14601

[51] Int. Cl.[7] .................. C23C 16/40; C23C 16/22
[52] U.S. Cl. .................. 427/225.21; 427/255.27; 427/255.36; 427/255.4; 427/377; 427/399
[58] Field of Search ............... 427/377, 399, 427/255.27, 255.4, 255.21, 255.32, 255.35, 255.36

[56] References Cited

U.S. PATENT DOCUMENTS

| | | | |
|---|---|---|---|
| 3,861,947 | 1/1975 | Hamling | 117/118 |
| 5,798,308 | 8/1998 | Chatterjee et al. | 501/103 |
| 5,910,462 | 6/1999 | Gani et al. | 501/80 |

*Primary Examiner*—Shrive Beck
*Assistant Examiner*—Kirsten A. Crockford
*Attorney, Agent, or Firm*—Morrison & Foerster LLP

[57] ABSTRACT

A method for strengthening and aging-prevention of a TZP ceramics includes the steps of: introducing TZP ceramic and Si-based ceramic powders into a furnace in which a water vapor pressure is controlled; and exposing the TZP ceramic next to Si-based ceramic in a flowing $H_2$ atmosphere containing $H_2O$ of no more than 0.1%, to form a silica/zircon layer on the surface of the TZP ceramic.

4 Claims, 8 Drawing Sheets

METHOD FOR STRENGTHENING AND AGING-PREVENTION OF TZP BY FORMATION OF SILICA/ZIRCON LAYER ON THE SURFACE THEREOF

BACKGROUND OF THE INVENTION

1. Field of the Invention

The present invention relates to a tetragonal zirconia polycrystalline (TZP) ceramic, and more particularly, to a method for producing a strong and aging-free TZP ceramic material by the formation of silica/zircon on the surface thereof.

2. Description of the Prior Art

TZP ceramics are one of the most widely used ceramic materials because of their excellent mechanical properties of hardness, strength, and fracture toughness. In spite of these merits, the TZP ceramics have two limitations; relatively low high-temperature strength and low-temperature environmental degradation.

The decrease in strength at high temperature is inherent to these materials because a martensitic transformation from tetragonal to monoclinic phase is the main toughening/strengthening mechanism. The driving force for the transformation decreases steadily with temperature until the monoclinic phase is thermodynamically stable, at which no phase transformation occurs.

Another drawback of the TZP ceramics is an unusual reduction in strength when exposed to air at temperatures between 150 and 400° C. [1]. This phenomenon is generally referred to as low-temperature environmental degradation, or just aging of the TZP. It is well known that the aging occurs by the spontaneous transformation of the zirconia from tetragonal to monoclinic phase, accompanied by the formation of microcracks. It is also well known that water vapor in the ambient gas promotes this aging process. Despite there are still some controversies about the detailed procedure and the exact role of the water vapor, it is generally agreed that the presence of water vapor is one necessary condition for the aging process. Therefore, the aging phenomenon might be suppressed if the TZP is not allowed to be directly contacted by water vapor, by the formation of some protective layer on the material surface. It has now been found that if a silica layer is formed on the surface of a TZP ceramic by a similar procedure, an improvement in the strength of the material is obtained. Furthermore, if the surface layer is effective in inhibiting the direct contact by water vapor with the material surface, the aging phenomenon can be suppressed.

SUMMARY OF THE INVENTION

In the accordance with the present invention, there is provided a method for strengthening and aging-prevention of a TZP ceramics comprising the steps of: introducing TZP ceramic and Si-based ceramic powders into a furnace in which a water vapor pressure can be controlled; exposing the TZP ceramic next to Si-based ceramic in a flowing $H_2$ atmosphere containing $H_2O$ of no more than 0.1%, whereby to form a silica/zircon layer on the surface of the TZP ceramic.

Here, it is preferable that the TZP ceramic is placed next to Si-based ceramics powder with a predetermined distance and angle in the furnace. Also, the Si-based ceramic may be one selected from the group consisting of SiC, $Si_3N_4$, SiAlON and Si. Also, the furnace is maintained preferably in the temperature range from 1300° C. to 1500° C.

Through the successive processes, the strengthening and aging-prevention effects of a 3Y-TZP ceramic are achieved.

BRIEF DESCRIPTION OF THE DRAWINGS

Others objects and aspects of the invention will come apparent from the following description of embodiments with reference to the accompanying drawings in which:

FIG. 2A shows the surface morphology, FIG. 2B shows the fracture surface, and FIG. 2C shows the surface morphology after the reaction layer was etched away;

FIG. 5A shows the pattern before and FIG. 5B show the pattern shows the pattern after aging at 250° C. for 400 h before the heat treatment; FIG. 5C shows the pattern before and FIG. 5D shows the pattern after aging at 250° C. for 400 h after the heat treatment;

DETAILED DESCRIPTION OF THE PREFERRED EMBODIMENTS

When SiC (or other Si-based materials, such as $Si_3N_4$, Si or SiAlON) is exposed to an $H_2$—$H_2O$ atmosphere, SiO gas is generated by the following reaction:

$$SiC(s)+2H_2O(g)=SiO(g)+CO(g)+2H_2(g) \tag{1}$$

Figure 1:
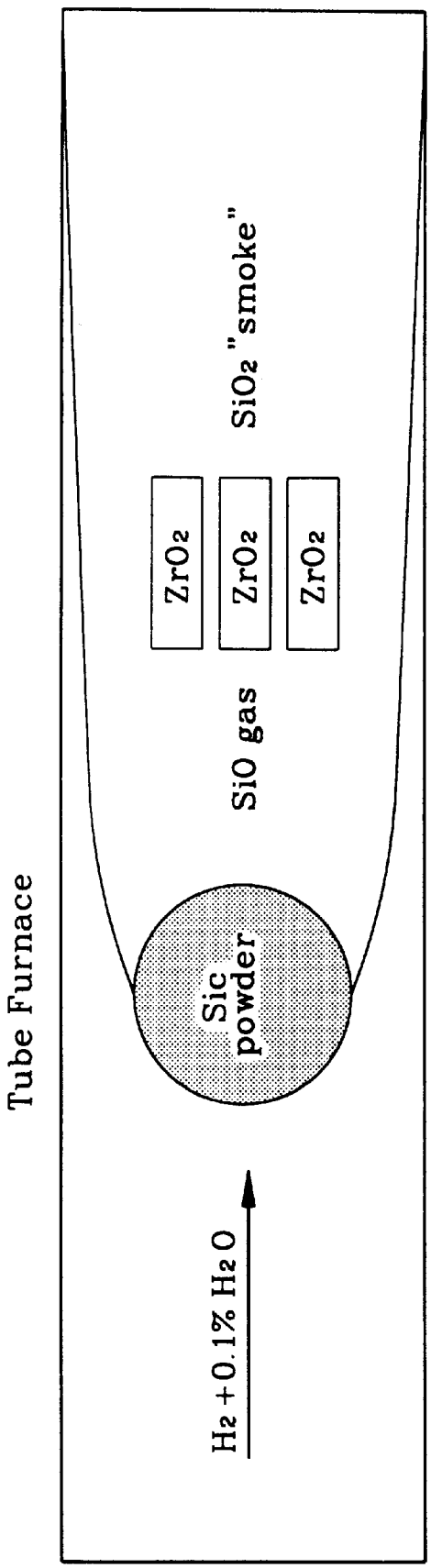
FIG. 1 is a schematic diagram of the heat-treatment procedure.

As the water vapor pressure in the $H_2$ atmosphere increases, the $P_{SiO}$ becomes higher until $P_{H2O}$ is about $1 \times 10^{-3}$ atm., at which $SiO_2$ "smoke" is formed away from the surface of the SiC. The smoke is formed by a gaseous reaction between the SiO gas generated by the reaction in Eq. (1) and the ambient $H_2O$ (the $P_{H2O}$ of which is much higher than that at the surface of the SiC). As a TZP ceramic placed in the $SiO_2$ smoke region, as schematically shown in FIG. 1, part of the smoke is deposited on the surface of the TZP. At first, the $SiO_2$ deposited on the TZP surface apparently reacts with the substrate to form zircon ($ZrSiO_4$). However, as the reaction continues, the diffusion path for Zr or Si is increased such that the formation of zircon is restricted, and consequently the $SiO_2$ which remains above the zircon layer of zircon and cristobalite becomes dense and uniform throughout the surface (FIGS. 2A to 2C) such that the mechanical properties of the TZP are strongly influenced by it.

For a better understanding of the present invention, together with other and further objects, advantages, and capabilities thereof, reference is made to the following examples.

To evaluate the effectiveness of the present invention, specimens were prepared by sintering a commercial TZP powder containing 3 mol % $Y_2O_3$ as a stabilizer at 1600° C. for 3 h in air. Two groups of specimens were prepared. In the first group, the material was ground with a 200-grit diamond abrasive wheel and subsequently polished with diamond paste down to a surface roughness of 1 micron. In the second group, the specimens were finished by simply grinding with the 200-grit diamond abrasive wheel.

Groups of at least five specimens were placed in a resistance heated alumina tube furnace next to a bed of SiC powder as schematically shown in FIG. 1, and heated at 1400° C. or 1450° C. for times up to 4 h. The atmosphere was flowing $H_2$ gas (~0.9 cm/sec) at a pressure slightly greater than 1 atm and having a $P_{H2O}$ of $1\times10^3$ atm. Before passing through the furnace, the $H_2$ gas was purified by passing it through columns of $CaSO_4$ and activated alumina. The $P_{H2O}$ Of the atmosphere was controlled by bubbling the purified $H_2$ through a column of distilled water.

The heat treated specimens were exposed to air at 250° C. for up to 400 h to evaluate the aging behavior.

EXAMPLE 1

Figure 2:
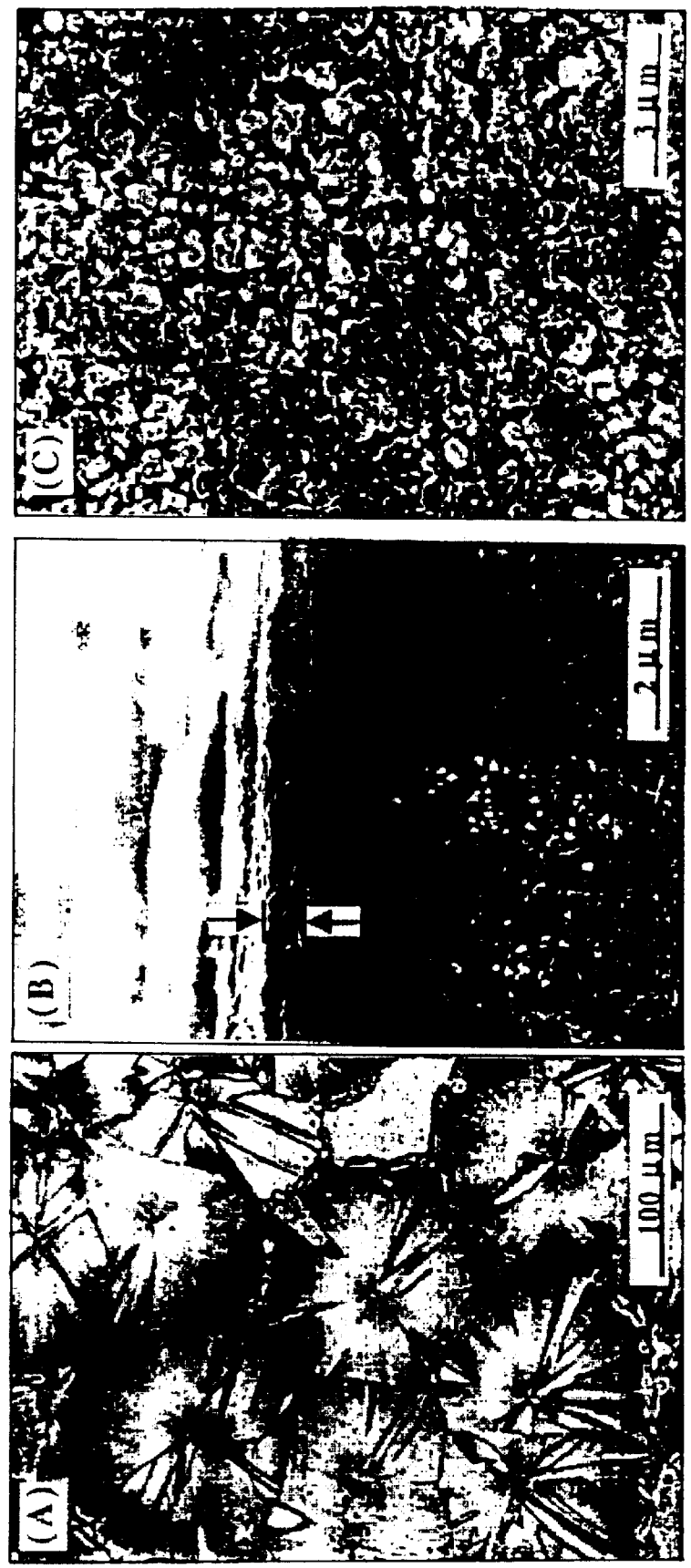
FIGS. 2A to 2C are SEM micrographs of a TZP specimen after heat treatment.

Surface morphologies of a TZP specimen after the heat treatment in the $H_2$–0.1% $H_2O$ atmosphere in the presence of SiC powder are shown in FIGS. 2A to 2C. Before the heat treatment, the polished surface of the specimen was basically featureless except for the presence of small pores. After the heat treatment in the atmosphere at 1450° C. for 1 h, reaction products of spherulitic shape were formed on the surface, as seen in FIG. 2A. The SEM micrograph of the fracture surface illustrates that the layer had a fairly uniform thickness of about 0.5 μm (FIG. 2B). When the reaction layer was etched away with a dilute HF solution, the surface became very rough, as shown in FIG. 2C, indicating that there had been some chemical reaction between the deposited product and the zirconia substrate.

Figure 3:
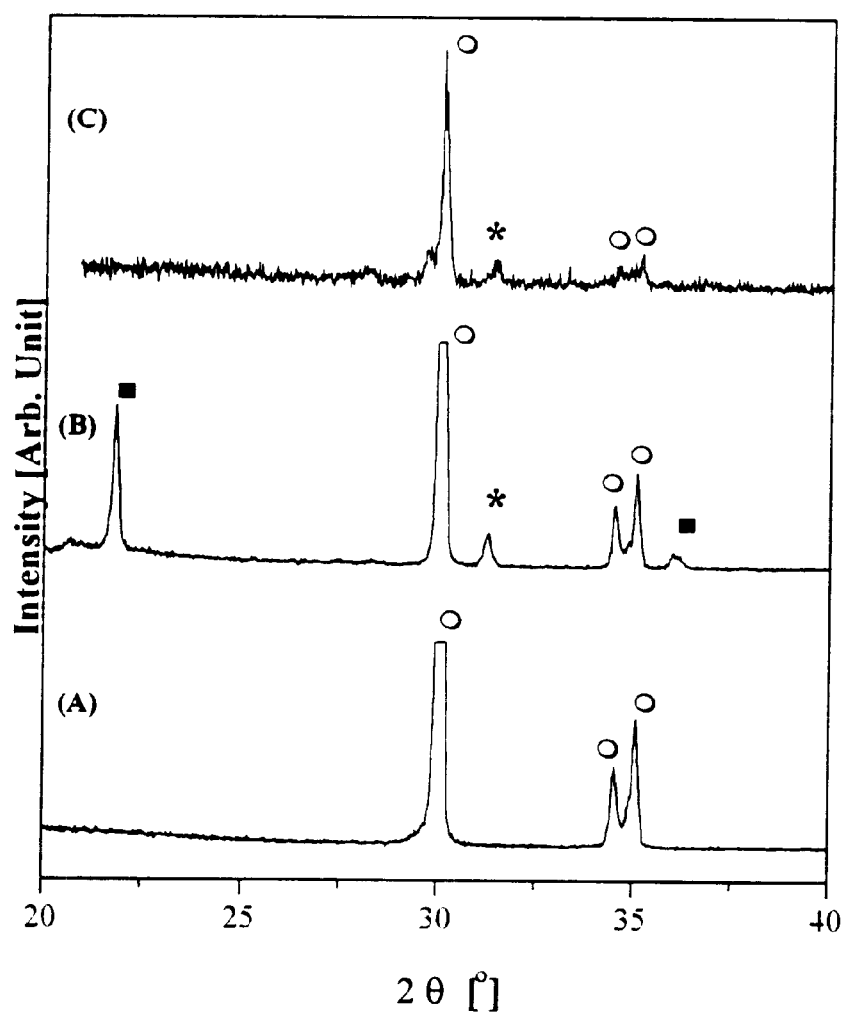
FIGS. 3A to 3C are X-ray diffraction patterns of the TZP ceramic, FIG. 3A showing the pattern before the heat treatment, FIG. 3B showing the pattern after the heat treatment, and FIG. 3C showing the pattern after removing the reaction layer.

The reaction product on the surface was identified by X-ray diffraction (XRD) analysis. The XRD pattern before the heat treatment, in FIG. 3A, shows that the specimen was composed of a 100% tetragonal phase. The XRD pattern after the heat treatment indicated that the layer formed on the surface was composed of cristobalite and zircon ($ZrSiO_4$), as shown in FIG. 3B. This pattern also illustrates that a phase transformation of the specimen did not occur. When the specimen was immersed in the HF solution, all the cristobalite was etched away but some of the zircon still remained as shown in FIG. 3C. These XRD patterns, coupled with the etched surface shown in FIG. 2C, indicate that the zircon was formed at the interfacial region by a reaction between the cristobalite and the zirconia substrate.

EXAMPLE 2

Figure 4:
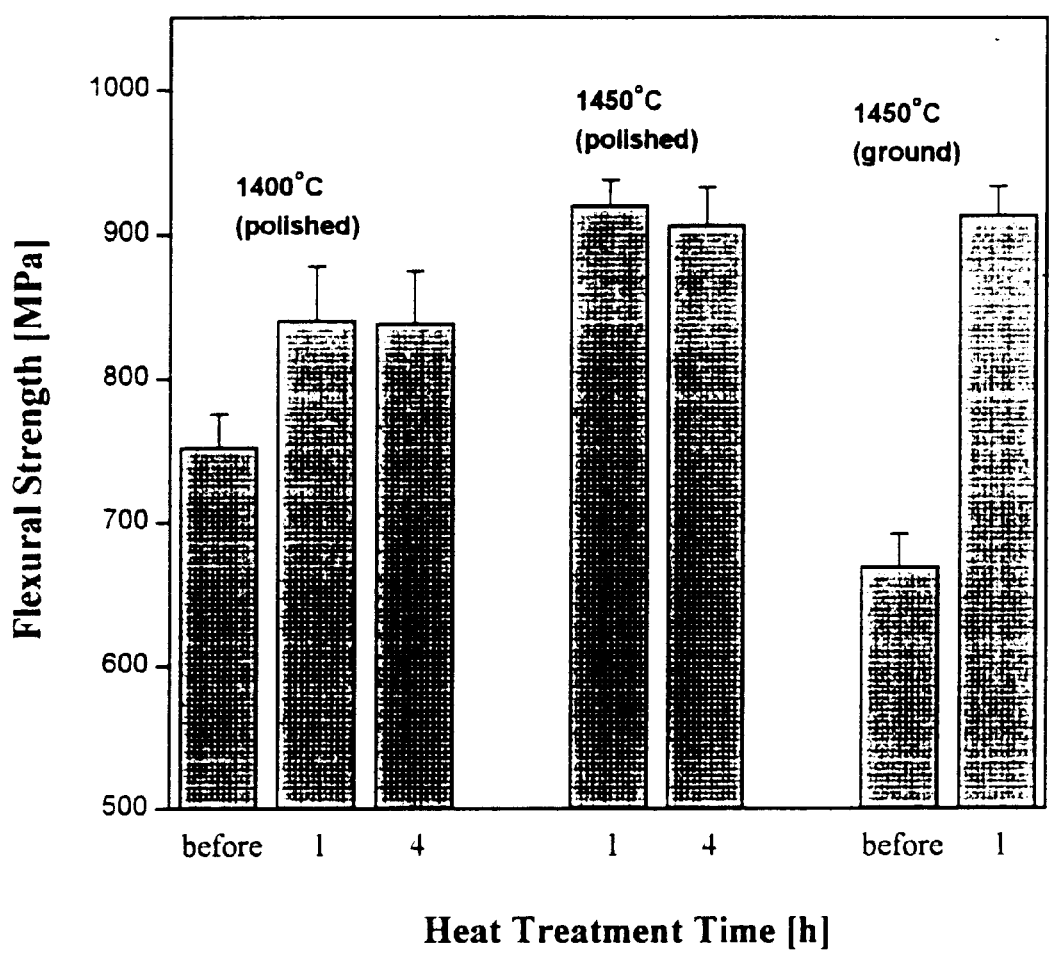
FIG. 4 is a graph showing effects of the heat treatment time on the flexural strength of the TZP ceramics.

Effects of such heat treatment (and consequent formation of the reaction layer) on the flexural strength of the TZP are shown in FIG. 4. When the specimens were heat treated at 1400° C. for 1 h, the strength was increased from 750 MPa to 840 MPa. With the increase in the heat treatment temperature to 1450° C., the strength was further increased to 920 MPa. However, as seen in FIG. 4, the exposure time had no significant effects on the strength.

EXAMPLE 3

Similar strengthening effects were observed from just ground (not polished) specimens. As seen in FIG. 4, even though the strength of the as-ground specimens was lower than that of the as-polished ones, the strengths after the heat treatment at 1450° C. for 1 h were almost identical with each other. These results imply that, because of the formation of an oxide layer on the surface, the severity of strength determining flaws at the surface becomes more or less the same, regardless of the pre-exposure surface finish of a TZP ceramic.

EXAMPLE 4

Figure 5:
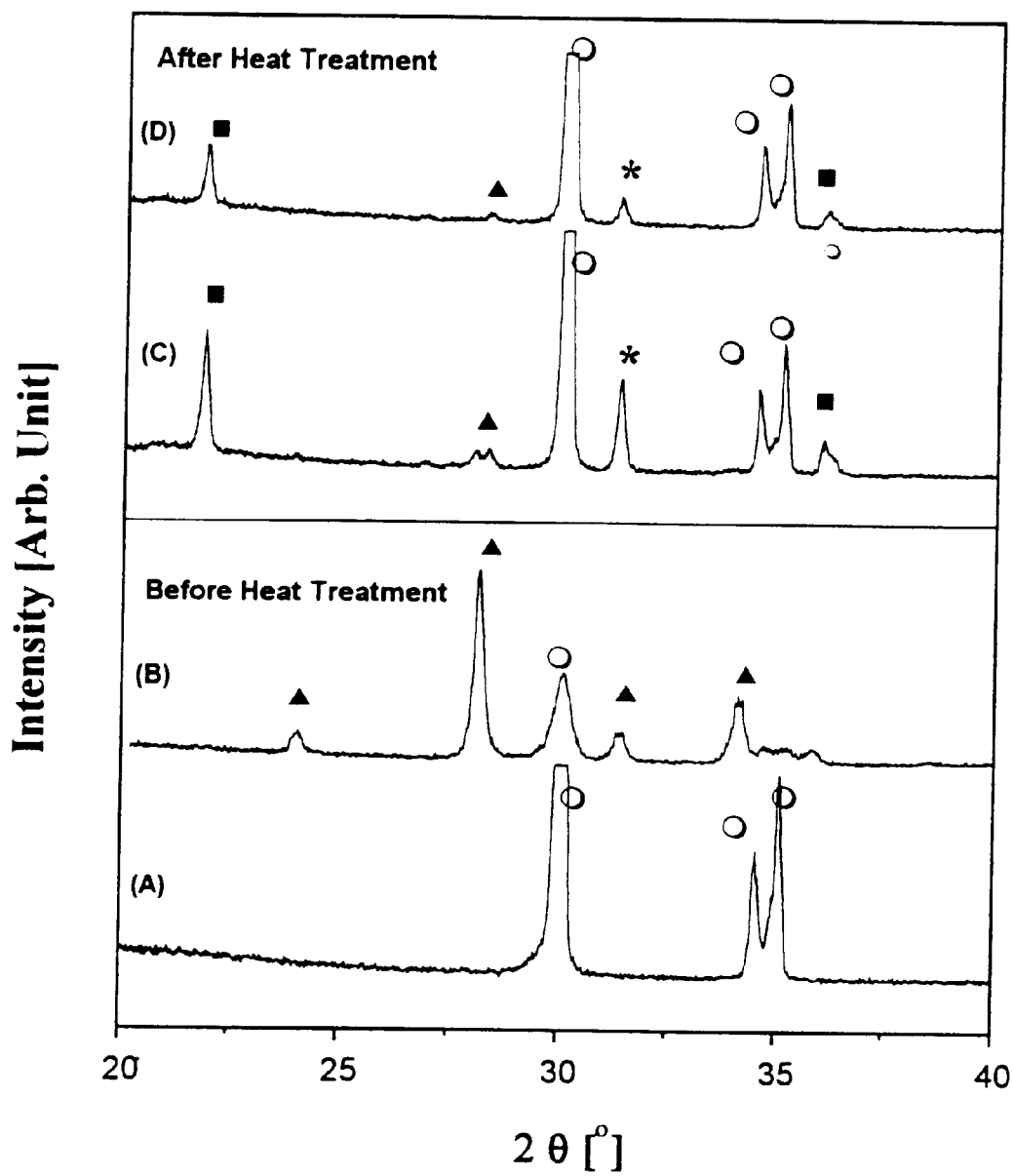
FIGS. 5A to 5D are X-ray diffraction patterns of the TZP ceramics.
Figure 6:
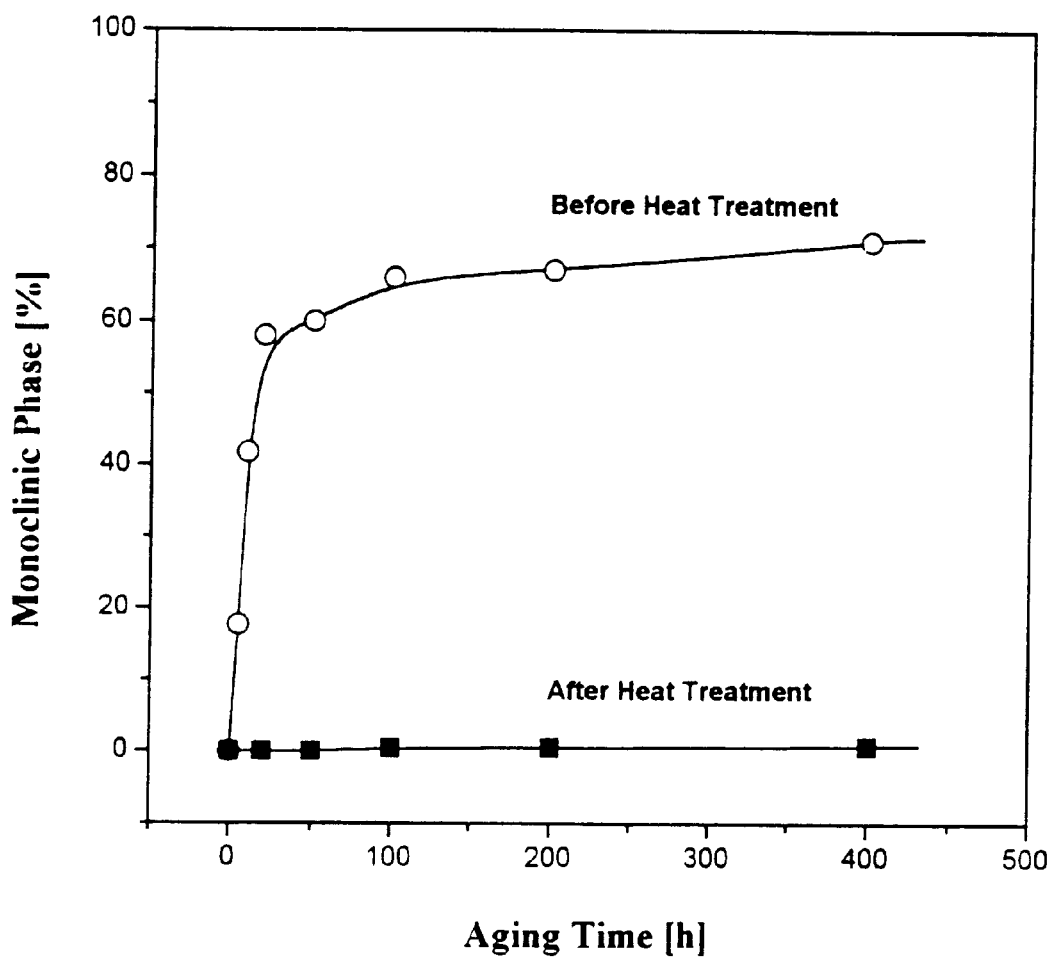
FIG. 6 is a graph showing the strength of polished specimens after exposure to air at 250° C. over time, before and after heat treatment.

Effects of the surface layer on the aging behavior of the TZP were analyzed by the X-ray diffraction patterns shown in FIGS. 5A to 5D. The phase of the specimen without the heat treatment before the aging was 100% tetragonal as seen in FIG. 5A. When this specimen was exposed to air at 250° C. for 400 h, extensive transformation to monoclinic phase occurred as shown in FIG. 5B. On the other hand, when the heat-treated specimen, on which a layer composed of cristobalite and zircon had been formed (FIG. 5C), was exposed to air at 250° C. for 400 h, transformation to the monoclinic phase was negligible, as seen in FIG. 5D. For the specimen before the heat treatment, when exposed to air at 250° C. for 20 h, spontaneous transformation occurred rapidly so that about 60% of the TZP was transformed into the monoclinic phase at the surface region, as shown in FIG. 6. The fraction of the monoclinic phase increased steadily with further exposures. On the other hand, the heat-treated specimen exhibited a negligible degree of spontaneous transformation under the same exposures. These results indicate that the layer formed on the surface was very effective in suppressing the spontaneous transformation of TZP ceramics from the tetragonal to monoclinic phase. The role of the reaction layer is clearly the inhibition of the water vapor in the air from direct contact with the ceramic surface.

EXAMPLE 5

Figure 7:
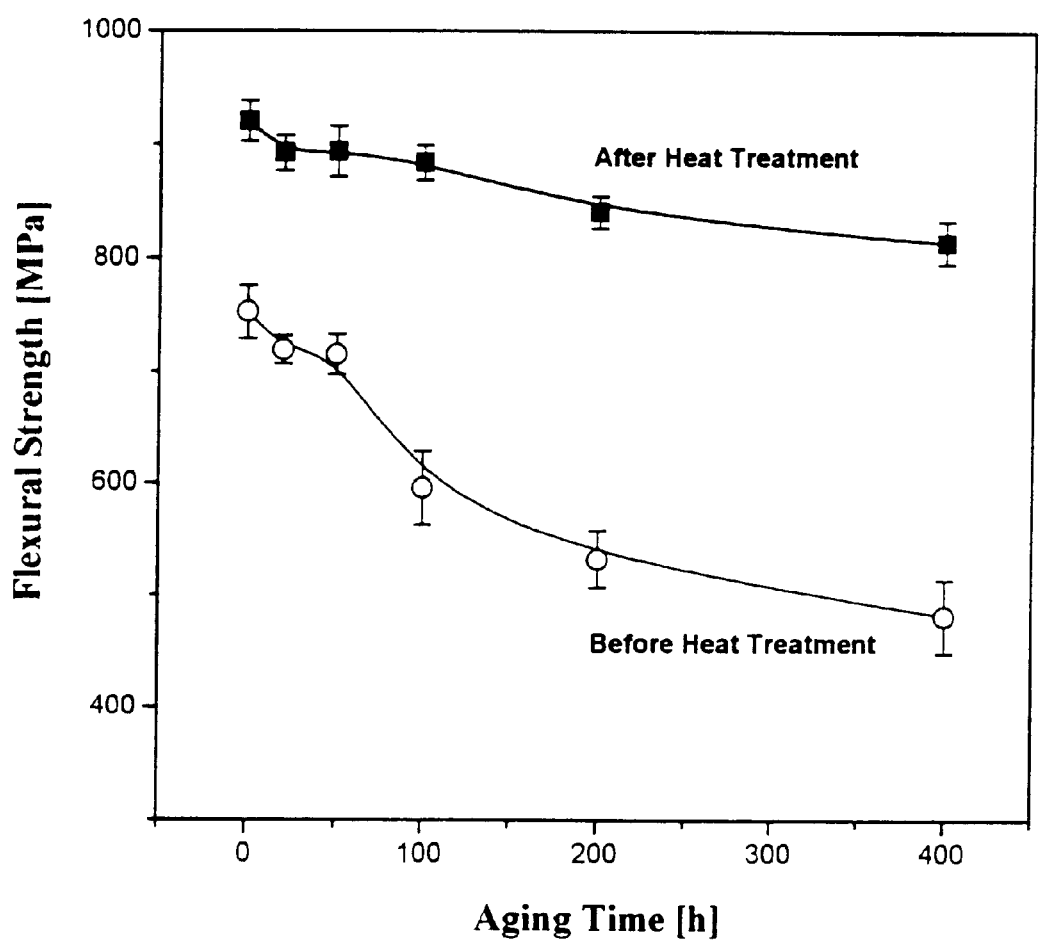
FIG. 7 is a graph showing the strength of polished specimens after exposure to air at 250° C. over time, before and after heat treatment.

The strength of the specimens after the aging process was also much influenced by such heat treatment. When specimens without the heat treatment were exposed to air at 250° C., the strength decreased rapidly with the exposure time as shown in FIG. 7. Similar reductions in strength, accompanied by spontaneous transformations to the monoclinic phase, have been reported previously. However, after formation of the reaction layer on the surface by the heat treatment, the reduction in strength (which had been increased from 750 to 920 MPa due to the crack blunting mechanism) by the same low-temperature exposure to air was negligible as shown in FIG. 7. This retention in strength reflects the result of the phase transformation well. The spontaneous transformation of the TZP ceramics to the monoclinic phase was suppressed by the reaction layer so that there was no reason for the strength reduction by such low-temperature exposures.

EXAMPLE 6

Figure 8:
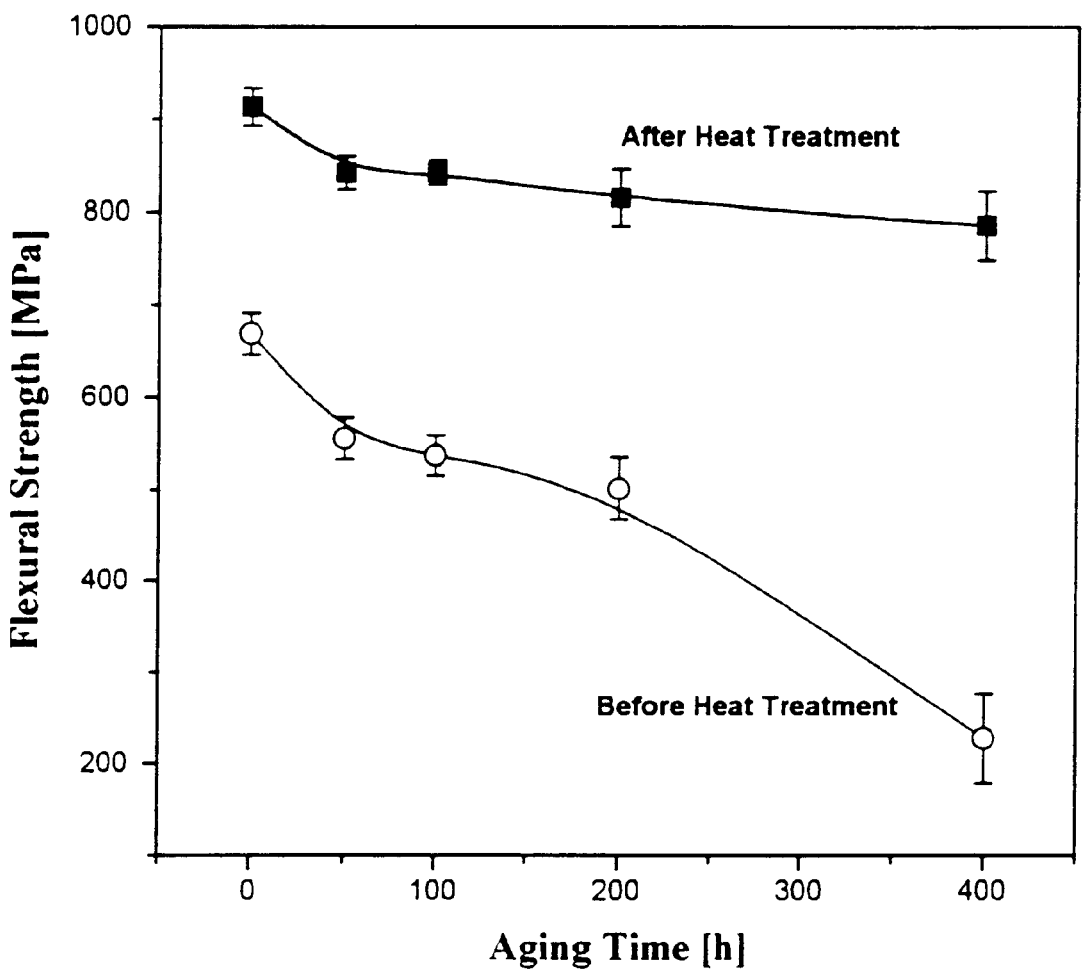
FIG. 8 is a graph showing the strength of ground (not polished) specimens after exposure to air at 250° C. over time, before and after heat treatment.

As was the case with the strength (FIG. 4), similar aging behavior was observed from just ground (not polished) specimens. As seen in FIG. 8, the variations in strength due to low-temperature exposure were about the same as those attained in the polished specimens. While the strength of the specimen before the heat treatment decreased rapidly with exposure to air at 250° C., that of the heat treated specimens remained about the same as was the case for the polished specimens. This result is quite reasonable considering that strengthening and the aging-prevention of the specimens occurred through the formation of a reaction layer on the surface. Therefore, utilizing this heat-treatment process, a strong and non-aging TZP material can be generated even without polishing.

What is claimed is:

1. A method for strengthening and aging-prevention of a tetragonal zirconia polycrystalline (TZP) ceramics comprising the steps of:

introducing TZP ceramic and Si-based ceramic powders into a furnace in which a water vapor pressure is controlled;

exposing the TZP ceramics next to Si-based ceramic in a flowing $H_2$ atmosphere containing $H_2O$ of no more than 0.1%, said $H_2O$ being present in an amount sufficient to form SiO gas from said Si-based ceramic;

forming said SiO gas;

forming $SiO_2$ smoke from said SiO gas; and then bringing said $SiO_2$ smoke into contact with said TZP ceramics to form a silica/zircon layer on the surface of the TZP ceramics.

2. The method according to claim 1, wherein the TZP ceramic is placed next to Si-based ceramics powder at a predetermined distance and angle in the furnace.

3. The method according to claim 1, wherein the Si-based ceramic is one selected from the group consisting of SiC, $Si_3N_4$, SiAlON and Si.

4. The method according to claim 1, wherein the furnace is maintained at a temperature in the range from 1300° C. to 1500° C.

* * * * *